United States Patent Office 2,814,948
Patented Dec. 3, 1957

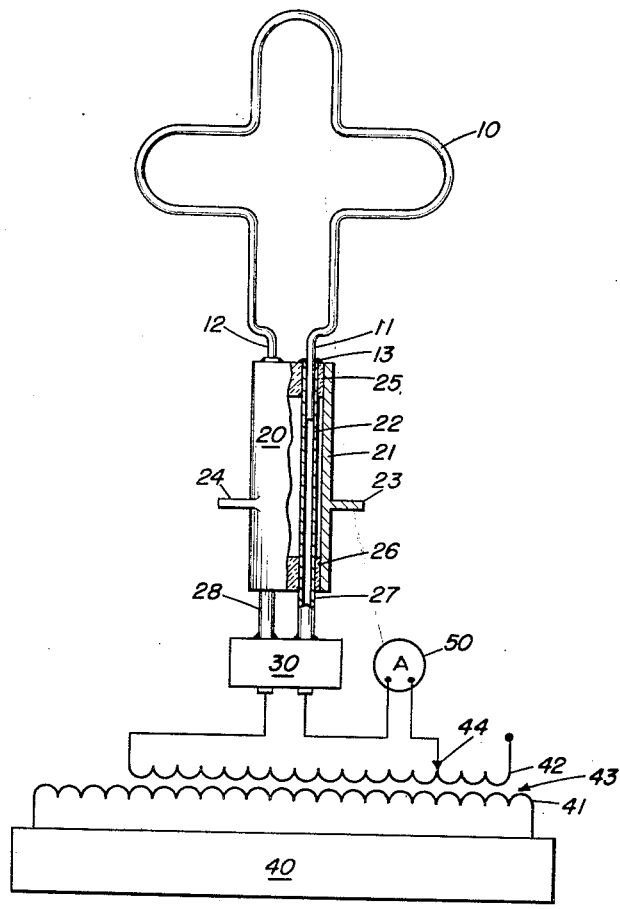

2,814,948

HEATED WIRE LIQUID-WATER CONTENT METER

Carr B. Neel, Jr., Palo Alto, Calif.

Application January 5, 1953, Serial No. 329,754

2 Claims. (Cl. 73—170)

(Granted under Title 35, U. S. Code (1952), sec. 266)

The invention described herein may be manufactured and used by or for the Government of the United States of America for governmental purposes without the payment of any royalties thereon or therefor.

This invention relates to a system and apparatus for measuring liquid concentration of clouds.

Extensive use of airplanes capable of flights in icing conditions has brought about the need for a simple instrument to measure the severity of icing conditions. In order to overcome the disadvantages of previously known instruments for this purpose, this instrument has been made simple, rugged, inexpensive and with no relatively moving parts. An instrument such as this is adapted for installation on a large number of airplanes and would allow the compilation of a fund of icing meteorological data as well as providing the pilot of an airplane with information on icing conditions. Other advantages of this system over the previously known systems are that it does not require constant attention, it contains no moving parts, it responds rapidly to changes in water content, and it can be arranged to provide both a direct indication and a continuous record of the liquid-water content.

It is, therefore, an object of this invention to provide a system for measuring the liquid-water concentration of icing clouds in flight, which will be inexpensive, simple, rugged and quick responsive.

It is another object of this invention to provide a system capable of measuring the liquid-water content of clouds at above or below freezing temperatures.

It is a further object of this invention to provide a system for measuring liquid-water content which will have no relatively moving parts.

Still another object of this invention is to provide a ssytem for measuring the liquid-water concentration of clouds below or above the freezing point of water which is easily adapted for direct, continuous and instantaneous indications of liquid-water concentration.

Another object of this invention is to provide a method for producing an instantaneous, direct and continuous measurement of the liquid-water content of clouds at temperatures above or below the freezing point of water.

The single figure of the drawings is a diagrammatic representation of a simplified embodiment of this invention.

In the present invention, the sensing element of the instrument consists simply of a loop of electrical resistance wire which is mounted in the air stream of an airplane. The resistance wire is heated by passing current through it. Its change in resistance, resulting from the cooling due to evaporation of impinging water droplets, is used as a measure of liquid-water content.

Referring now to the drawing, 10 denotes a loop of resistance wire having known temperature-resistance characteristics. This characteristic may be determined by test in a temperature controlled oven and the data obtained is used for the purpose of calibrating the instrument. The resistance wire 10 has two end legs 11 and 12 which are mounted snugly by means of silver solder joints 13 in electrical contact with copper sleeves 22 in mounting block 20. The mounting block 20 consists of a hollow cylinder 21 of stainless steel on which are integrally mounted a pair of mounting lugs 23, 24 for mounting the resistance wire in the airstream of an airplane. Within each end of the cylinder 21 is secured a block of insulating material, such as Transite, as shown at 25 and 26. The blocks of insulating materials are apertured so as to snugly receive the copper sleeves 22. The lower ends 27 and 28, of the copper sleeves extend from the block 20, and by means of suitable terminal lugs (not shown) are connected to a terminal box 30.

Since it is desired to employ the resistance change of the wire 10 to measure liquid-water content, a regulated alternating voltage source 40, having a voltage output of constant amplitude is provided to supply the primary 41 of a step down transformer 43. The constant voltage output of the secondary 42 is adjusted by means of sliding contact 44 to obtain a current through resistance wire 10 sufficient to raise the temperature thereof to a degree above the boiling point of water. An ammeter 50 is connected in series with the resistance wire 10 and the secondary 42. A conventional recorder (not shown) or other instrument may also be used and is desirable for compiling data in flight.

In operation, the voltage output of the secondary 42 having been adjusted by means of contact 44 current flows from the secondary 42, through terminal box 30 to resistance wire 10, meter 50 and back to the secondary 42. As a result, the resistance wire is then at a temperature above the boiling point of water. As water droplets of an icing cloud impinge on the wire, they are evaporated by the heat of the resistor and the flow of the airstream, thereby causing a cooling of the wire and causing its resistance to change. The amount of change of resistance is a measure of the degree of cooling of the wire and, therefore, a measure of the liquid water content of the cloud. Since a constant voltage source is employed, a change in the resistance of resistance wire 10 will produce a change in current flowing through the series circuit. The change in current is measured by the meter 50 or a recording instrument or both. The meter 50 is calibrated in terms of liquid-water content and thus provides a direct and instantaneous indication.

The resulting instrument is a small, rugged simple device with no relatively moving parts. The device can be used in above freezing clouds as well as in below freezing clouds. By using a resistance wire in the order of $\frac{1}{16}$ inch in diameter, a very rapid response to changes in liquid water content is achieved. The shape of the resistance wire loop 10 is immaterial. It may be a length of resistance wire of any configuration. It is desirable, however, that the two adjacent legs 11 and 12 are at least eight to ten wire diameters apart. It is also desirable that the length of the wire be at least 50 wire diameters in order to avoid serious end effects.

From an engineering point of view, the sliding contact 44 may be unnecessary, if not undesirable. In a permanent installation, it may be preferable to obtain the desired output from the secondary of the transformer 43 by appropriate design of the voltage regulating system.

Having thus described my invention, what I claim as new and desire to secure by Letters Patent is:

1. Means for measuring the liquid-water content of a cloud in the flight path of an airplane comprising: a length of exposed resistance wire having parallel spaced ends; a supporting block for mounting said ends; means on said block for mounting said wire in said flight path; a source of heating current for heating said resistor to a point above the boiling point of water, whereby water impinging on said wire is evaporated, said source comprising a regulated voltage supply and means for adjusting the output of said regulated voltage supply, electrical conducting means in said block connecting said wire to said source; and electrical measuring means connected in circuit with said wire for measuring the change in resistance of said wire due to cooling.

2. Means for measuring the liquid-water content of an airstream comprising: a length of exposed resistance wire having a known temperature resistance characteristic of substantial magnitude; means mounting said resistance wire in said airstream so as to contact the liquid-water therein; means to heat said resistance wire to a temperature above the vaporizing temperature of said liquid-water, said heating means comprising a source of constant potential and means connecting said resistance wire to said source; and means responsive to the vaporization of liquid water on said wire to measure the change in resistance thereof caused by the cooling of said wire by said vaporization to thereby measure the liquid-water content of said airstream.

References Cited in the file of this patent
UNITED STATES PATENTS

| | | |
|---|---|---|
| 1,156,660 | Berg | Oct. 12, 1915 |
| 1,855,774 | Schneider | Apr. 26, 1932 |
| 2,381,299 | McCulloch | Aug. 7, 1945 |
| 2,501,377 | Cherry | Mar. 21, 1950 |
| 2,642,737 | Kinsella | June 23, 1953 |
| 2,702,471 | Vonnegut | Feb. 22, 1955 |